United States Patent [19]

Nason

[11] Patent Number: 4,790,640
[45] Date of Patent: Dec. 13, 1988

[54] LABORATORY SLIDE

[76] Inventor: Frederic L. Nason, 6830 Orion Ave., Van Nuys, Calif. 91406

[21] Appl. No.: 786,745

[22] Filed: Oct. 11, 1985

[51] Int. Cl.⁴ .................... G02B 21/34; G01N 21/01
[52] U.S. Cl. .................................. 350/534; 350/536; 156/99
[58] Field of Search ............... 350/320, 534, 535, 536; 428/426; 156/99, 291; 40/158 B

[56] References Cited

U.S. PATENT DOCUMENTS

| | | | |
|---|---|---|---|
| 3,432,275 | 3/1969 | Unger | 350/536 |
| 3,551,023 | 12/1970 | Brackett | 350/536 |
| 3,736,042 | 5/1973 | Markovits et al. | 350/536 |
| 3,777,283 | 12/1973 | Elkins . | |
| 3,888,629 | 6/1975 | Bagshawe . | |
| 3,961,346 | 6/1976 | White | 350/536 |
| 3,963,355 | 6/1976 | Aldridge, Jr. et al. . | |
| 4,038,151 | 7/1977 | Fadler et al. . | |
| 4,171,866 | 10/1979 | Tolles | 350/536 |
| 4,188,246 | 2/1980 | Lipshaw | 428/13 |
| 4,441,793 | 4/1984 | Elkins | 350/536 |
| 4,447,140 | 5/1984 | Campbell et al. | 350/534 |
| 4,596,695 | 6/1986 | Cottingham | 422/58 |

OTHER PUBLICATIONS

V-Tech, Inc. advertising literature entitled "Count-10 System for Standardized Microscopic Urinalysis".
FisherScientific advertising literature entitled "Fisherbrand Urisystem".
Further Improvements in the Plaque Technique for Detecting Single Antibody-Forming Cells, by Cunningham and Szenberg, Immunology 1968, 14, 599-600.

Primary Examiner—John K. Corbin
Assistant Examiner—Ronald M. Kachmarik
Attorney, Agent, or Firm—Kelly, Bauersfeld & Lowry

[57] ABSTRACT

An improved laboratory slide and related methods of manufacture and use, wherein the slide is designed for analysis and/or testing of liquid specimens and the like. The improved slide comprises a transparent upper coverslip affixed to a lower slide plate by a thin bonding agent of controlled thickness which may be a substantially monocellular thickness on the order of about 0.001 inch or less. In some forms, the bonding agent is shaped in cooperation with the slide plate and coverslip to define one or more examination chambers into which liquid specimens may be drawn by capillary action for viewing and analysis. In other forms, the bonding agent defines one or more elongated flow channels through which a specimen may be drawn, wherein the flow channels may be of varying height and/or include selected reagents along their lengths to perform selected testing of biological specimens and the like.

37 Claims, 3 Drawing Sheets

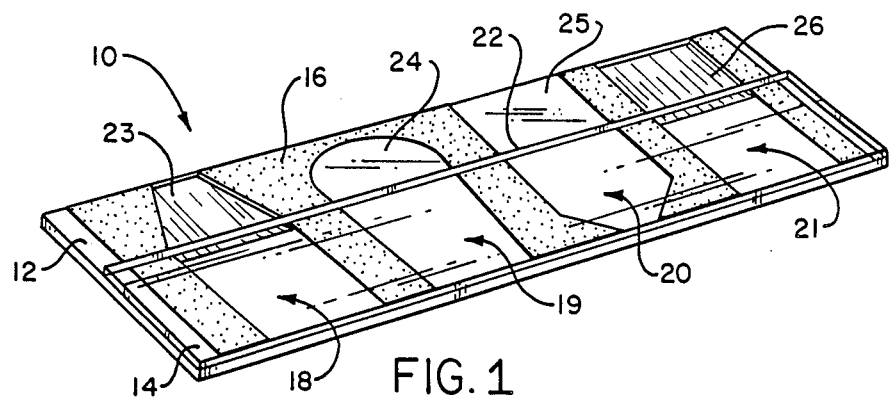
FIG. 1
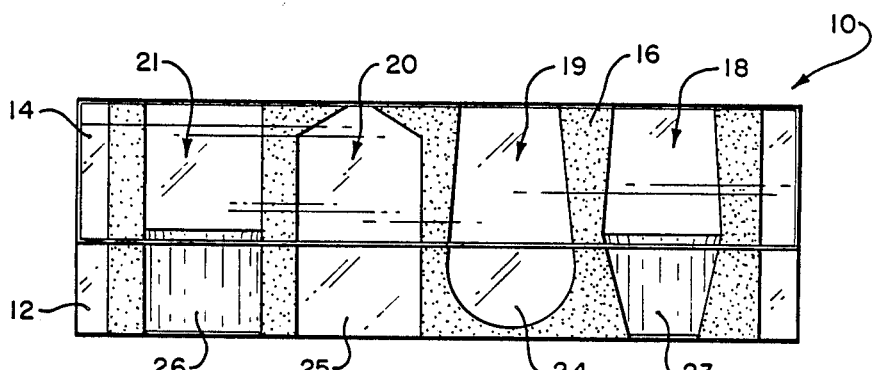
FIG. 2
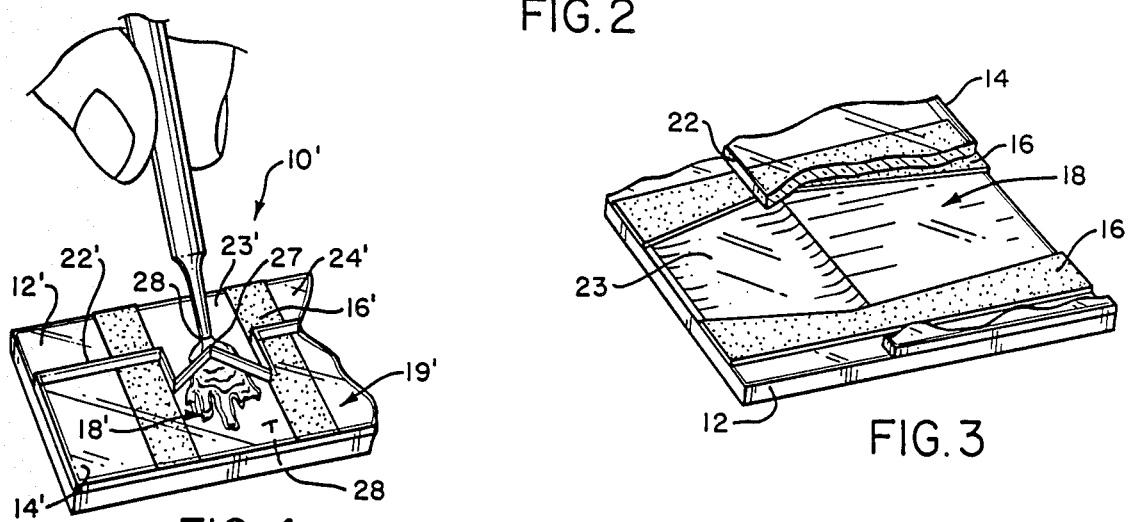
FIG. 4
FIG. 3
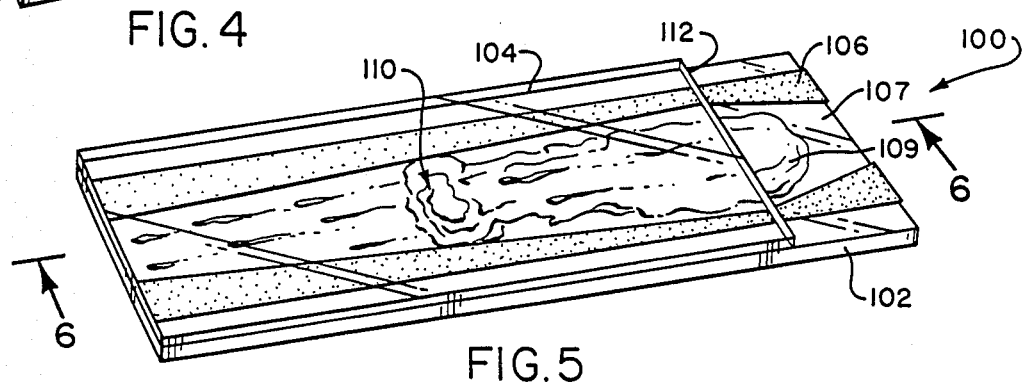
FIG. 5

LABORATORY SLIDE

BACKGROUND OF THE INVENTION

This invention relates generally to laboratory slides on the type used for the examination and/or selected testing and analysis of liquid specimens, such as biological specimens and the like. More particularly, this invention relates to improved yet relatively simple and economical constructions for a laboratory slide having an examination chamber or flow channel of substantially monocellular height dimension, if desired.

Laboratory slides are used widely in the examination of a wide variety of liquid and liquid-based specimens. For example, laboratory slides are well known in the medical arts for supporting a specimen of biological origin, such as blood, serum, urine, and the like, to facilitate optical examination of the specimen for medical purposes. In the past, such laboratory slides have comprised a lower transparent slide plate upon which the specimen is placed and then covered by an overlying transparent coverplate, commonly referred to as a "coverslip." The coverslip spreads the specimen into a relatively thin film confined between the slide plate and coverslip to facilitate specimen handling in the course of specimen examination, for example, by microscope inspection to obtain a particle count or other visually perceivable information. One major disadvantage with laboratory slides of this general type, however, relates to the inability to repeatedly control the thickness of the specimen film between the slide plate and coverslip, wherein precise knowledge of the depth of the film is important to insure accurate test results, Variations in the film dimension undesirably lead to significant errors upon optical inspection.

In efforts to obtain a controlled and repeatable specimen film thickness, laboratory slides have been developed with the slide plate and coverslip molded integrally or otherwise rigidly affixed to each other and shaped to define a laterally open examination chamber into which a liquid specimen may be drawn by capillary action. See, for example, U.S. Pat. No. 3,777,283. While such slides advantageously insure consistency of specimen film thickness during examination, manufacturing size and tolerance limitations have prevented the use of extremely thin film thicknesses approaching substantially monocellular dimensions. Instead, available laboratory slides have been restricted to specimen film thicknesses corresponding with several cellular layers, such as 0.004 inch or larger, thereby requiring the laboratory technician to exercise considerable skill to examine the depth of field of the liquid specimen if accurate analysis is to be obtained. As a result, even with examination chambers of controlled height dimension as small as 0.004 inch, a significant margin of error remains.

There exists, therefore, a significant need for an improved laboratory slide having an extremely thin and closely controlled and preferably substantially monocellular spacing between a lower slide plate and an overlying coverslip. The present invention fulfills such needs and provides further related advantages.

SUMMARY OF THE INVENTION

In accordance with the invention, an improved laboratory slide is provided for testing and/or analysis of liquid specimens, wherein the slide comprises a thin examination chamber or flow channel which can be formed to have a substantially monocellular spacing between a transparent lower slide plate and a transparent overlying coverslip. The spacing between the slide plate and the coverslip is controlled by a thin bonding agent or spacer element interposed therebetween, wherein this bonding agent defines the chambers or flow channel with a height dimension as low as on the order of 0.001 inch or less.

In one preferred form of the invention, the lower slide plate and the overlying coverslip are formed from transparent glass or, in the alternative, one or both may be formed from a selected transparent plastic material. The bonding agent is applied to the slide plate or to the coverslip in a selected geometry to define one or more examination chambers, after which the coverslip is placed over the slide plate and affixed thereto by means of the bonding agent. Preferred bonding agents may include a thin layer of a pressure-sensitive or hot melt adhesive or a thin ink layer, such as an epoxy or ultraviolet curable ink, which is cured subsequent to coverslip placement and thus secures the coverslip with respect to the slide plate.

The lower slide plate has a transverse width greater than the width of the coverslip to define one or more specimen placement sites respectively at positions laterally alongside the examination chamber or chambers. Alternately, openings can be formed in the coverslip to define specimen placement sites upon the slide plate. Liquid specimen placed onto these placement sites in contact with the adjacent, marginal edge of the coverslip are drawn by capillary action into the adjacent examination chamber. This drawing action can be enhanced by tailoring the placement site to include a shallow well as by chemical etch frosting of the slide plate with the frosted region protruding a short distance beneath the adjacent marginal edge of the coverslip. When a plastic coverslip is used, a discontinuity in the coverslip marginal edge, such as a pointed edge region, further assists in breaking liquid surface tension to insure capillary flow action of the specimen into the examination chamber.

In accordance with further forms of the improved laboratory slide, the bonding agent can be applied with a geometry defining an elongated flow channel of controlled spacing or height dimension between the slide plate and the subsequently mounted coverslip. A liquid specimen applied adjacent a marginal edge of the coverslip is drawn by capillary action for flow through the flow channel in a quantitative predetermined amount and flow rate dictated by channel size dimensions and substantially independent of the presence of excess specimen. Specimen flow through the flow channel may be controlled further by varying, for example, reducing, the height of the flow channel and/or by contacting the specimen with one or more selected reagents disposed at predetermined positions along the flow channel. In some forms, multiple flow channels may be provided for performance of certain analytical tests and/or the flow channel may be elongated or include widened or deepened regions to provide further control of specimen flow.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating one preferred form for a laboratory slide embodying the novel features of the invention, the slide including a plurality of examination chambers permitting optical examination of liquid specimens and the like;

FIG. 2 is a top plan view illustrating the slide of FIG. 1;

FIG. 3 is an enlarged fragmented perspective view illustrating portions of the slide of FIGS. 1 and 2;

FIG. 4 is a fragmented perspective view illustrating one alternative form of the improved laboratory slide;

FIG. 5 is a perspective view illustrating an additional alternative preferred form of the improved laboratory slide of the invention, the slide including an elongated flow channel for passage of a liquid specimen;

DETAILED DESCRIPTION OF THE PREFERRED EMBODIMENTS

Figure 6:
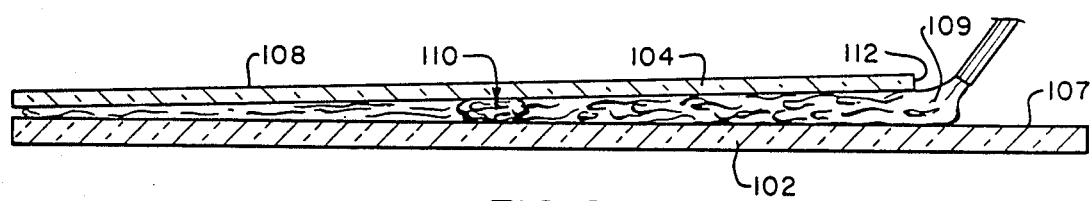
FIG. 6 is an enlarged longitudinal vertical section taken generally on the line 6—6 of FIG. 5.

As shown in the exemplary drawings, an improved laboratory slide is depicted in one preferred form in FIGS. 1-3 and referred to generally by the reference numeral 10. The improved slide comprises a lower slide plate 12 with an upper coverplate or coverslip 14 secured thereto by means of a thin bonding agent 16. The bonding agent is applied to the slide plate 12 in a selected pattern and with a precision controlled thickness to define one or more examination chambers or the like between the slide plate 12 and coverslip 14, with four examination chambers 18, 19, 20, and 21 being shown by way of example. The height of these examination chambers 18-21 can advantageously be limited to an extremely thin, substantially monocellular dimension, if desired.

The improved laboratory slide 10 of the present invention provides a relatively simple device adapted for high volume, relatively low cost manufacture while advantageously providing the capacity for a dimensional spacing between the lower slide plate 12 and overlying coverslip 14 of substantially monocellular magnitude. More particularly, in the laboratory analysis and testing of biological specimens, such as blood, urine, and the like, the improved slide 10 insures an extremely thin film distribution of the specimen to provide a narrow, preferably substantially monocellular depth of field on the order of 0.003 inch or less, and more preferably on the order of 0.001 inch or less. This thin film distribution thus has a significantly smaller thickness dimension than available with prior art laboratory slides to insure substantially enhanced accuracy of results upon visual analysis as required in the performance of different types of testing or analytical procedures.

In the form of the invention depicted in FIGS. 1-3, the slide plate 12 and the coverslip 14 are formed from thin transparent glass sheets of the type conventionally used in laboratory slides. The lower slide plate 12 has a generally rectangular configuration with sufficient longitudinal elongation to accommodate the illustrative four examination chambers 18-21, although the plate 12 may be constructed to have additional length to accommodate any desired number of examination chambers. The coverslip 14 also has a generally rectangular configuration with a length corresponding to the slide plate 12 and a width substantially less than the width of the slide plate.

Prior to mounting the coverslip 14 onto the slide plate 12, the thin bonding agent 16 is applied to the upwardly presented face of the slide plate 12. This bonding agent comprises a bonding substance capable of application onto the slide plate in a selected geometric pattern and with a precision controlled thickness of relatively thin dimension. A substantially monocellular thickness for the bonding agent layer is preferred, such as a thickness on the order of 0.003 inch or less, and, more preferably on the order of 0.001 inch or less. Preferred bonding agent substances include a variety of curable inks, such as epoxy and ultraviolet curable inks which can be printed directly onto the slide plate 12 by silk screening or other known printing techniques. Other bonding agent materials may include, for example, a thin pressure-sensitive or temperature activated adhesive material applied to the slide plate in a prescribed thickness.

The coverslip 14 is placed over the slide plate 12 subsequent to application of the bonding agent 16. When a curable ink is used, the coverslip 14 is placed onto the slide plate 12 prior to an ink cure step during which the ink effectively bonds to the slide plate and coverslip to maintain the precision controlled spacing therebetween. As shown best in FIGS. 1 and 2, the coverslip 14 is normally placed with one longitudinal marginal edge in overlying alignment with a corresponding side marginal edge of the slide plate 12, whereupon the opposite longitudinal marginal edge 22 of the coverslip 14 overlies a central region of the slide plate.

The bonding agent 16 is shaped to define the longitudinally spaced examination chambers 18-21 between the slide plate 12 and the coverslip 14. In addition, the layer 16 extends laterally beyond the marginal edge 22 of the coverslip to define a longitudinally spaced plurality of upwardly exposed specimen application sites or wells 23, 24, 25, and 26. Liquid or liquid-based specimens, such as biological specimens taken from patients, may be placed into the wells 23-26 in close proximal contact with the marginal edge 22 of the coverslip 24, whereupon the specimen will be drawn with thin film distribution by capillary action into the associated examination chamber. This capillary drawing action may be enhanced by forming the wells as shallow depressions in the slide plate 12, as viewed in FIG. 3, wherein this depression geometry can be obtained, for example, by chemical etch frosting the well preferably to extend the well a short distance beneath the coverslip marginal edge 22 to provide a somewhat enlarged entrance to the examination chamber, as depicted with respect to the wells 23 and 26. Still further, the capillary drawing action may be enhanced by venting the outboard lateral sides of the examination chambers 18-21, as is known in the art.

In use, the improved laboratory slide 10 insures an extremely thin film distribution of the laboratory specimen within the associated examination chamber, while simultaneously maintaining the chambers in separation from each other to prevent specimen cross-contamination. When desired, the thickness of the bonding agent 16 can be selected to be extremely thin, approaching or equalling a substantially monocellular dimension on the order of 0.001 inch or less. This effectively restricts the specimen film distribution to substantially one cellular or molecular layer for certain types of specimens, thereby enhancing the ease and accuracy of optical examination and the results obtained thereby.

In one adaptation of the slide shown in FIGS. 1-3, the coverslip may be formed from a thin, lightweight and transparent plastic material secured by the bonding agent 16 to the lower slide plate 12. With this construction, a specimen placed into one of the examination chamers is reduced to the thin film thickness, as described above, and may then be allowed to dry over a period of time. When the specimen is dry, the coverslip 14 can be separated quickly and easily from the slide plate to expose the dried specimen as a substantially monocellular smear which can be stained or otherwise treated for laboratory analysis purposes. The substantially monocellular nature of the smear can be extremely beneficial in obtaining accurate analytical results.

In one alternative form, as depicted in FIG. 4, a modified laboratory slide 10' includes a lower slide plate 12' and an upper coverslip 14' wherein either one or both may be constructed from a selected transparent plastic material of the type known for use in laboratory slides. In this embodiment, a thin bonding agent 16' of an appropriate ink, adhesive, or the like, is applied to the slide plate in strips to define one or more examination chambers 18', 19', etc., in spaced relation along the length of the slide. The bonding agent strips protrude on the upper face of the slide plate beyond the marginal edge 22' of the coverslip 14' to further define specimen application sites or wells 23', 24', etc., all generally in accordance with the slide 10 depicted in FIGS. 1-3.

In the embodiment of FIG. 4, however, the marginal edge 22' of the coverslip 14' is shaped to include at least one surface discontinuity at the entrance to each examination chamber. More specifically, as shown by way of example in FIG. 4, the marginal edge 22' is shaped to include a relatively sharp point 27 in an exposed position for contacting a liquid specimen 28 applied to the adjacent specimen well 23'. This pointed edge structure functions to disrupt or break liquid surface tension which otherwise inhibits capillary drawing of the specimen into the examination chamber. This surface tension phenomenon is particularly significant when the coverslip 14' is formed from a transparent plastic material; the marginal edge discontinuity overcomes the liquid surface tension and draws the specimen with thin film distribution into the examination chamber.

A further alternative preferred form of the invention is depicted in FIGS. 5 and 6 which illustrate a modified laboratory slide 100 adapted for performing a selected laboratory test. More particularly, the modified slide 100 includes a transparent lower slide plate 102 secured to an overlying coverslip 104 by means of a thin bonding agent 106, all generally in the manner described previously with respect to FIGS. 1-4. However, in this embodiment, the slide plate 102 and coverslip 104 have generally the same width and the coverslip has a somewhat shorter length to leave the upper face of the slide plate exposed at one end thereof. The bonding agent 106 is applied to the slide plate in laterally spaced, longitudinal elongated strips to define a shallow placement site or well 107 at the exposed end of the slide plate and an elongated flow channel 108 between the coverslip and slide plate. Accordingly, a liquid specimen 109 may be placed into the well 107 in close proximity with the adjacent end margin 112 of the coverslip 104, whereupon the liquid specimen will be drawn by capillary action to flow into and along the length of the flow channel 108.

As shown best in exaggerated proportion in FIG. 6, the spacing between the slide plate 102 and the coverslip 104 can be varied along the length of the flow channel 108 to provide valuable information in the course of analysis of the liquid specimen 109. More particularly, as illustrated, the upstream end of the flow channel 108 is dimensioned with a relatively small height which can be somewhat greater than a monocellular dimension. This height dimension can be decreased progressively or in discrete steps along the length of the flow channel, for example, by decreasing the density of the bonding agent 16 along the length of the flow channel 108. Such density variation is obtained relatively easily when a printed ink bonding agent is utilized by appropriate variation of pigment density within a solvent carrier. With this configuration, selected cells or particulate of a known size within the specimen may be filtered and trapped at a selected position within the flow channel, as depicted by arrow 110, with the visually detected presence of such trapped cells or particles providing valuable information to the observer. As one example, sickle cell anemia cells have a characteristic size variation and are more rigid than other cells, whereby a specimen from a sickle cell anemia patient will result in entrapment of certain cells along the flow channel to provide a visually detectable indication of the affliction.

Figure 7:
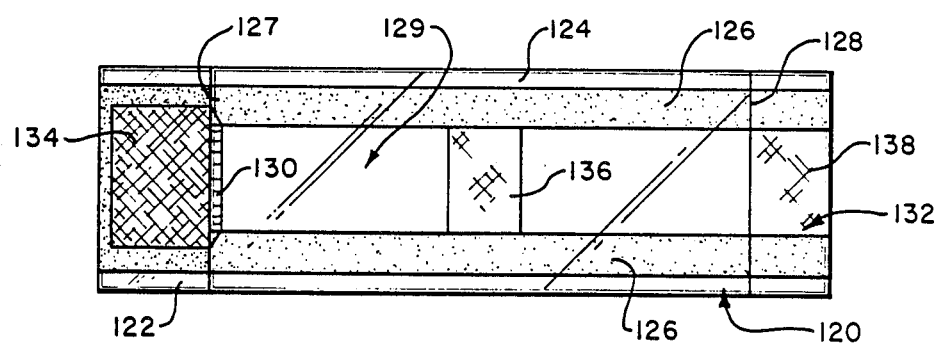
FIG. 7 is a top plan view illustrating a modified form of the slide including an elongated flow channel.
Figure 8:
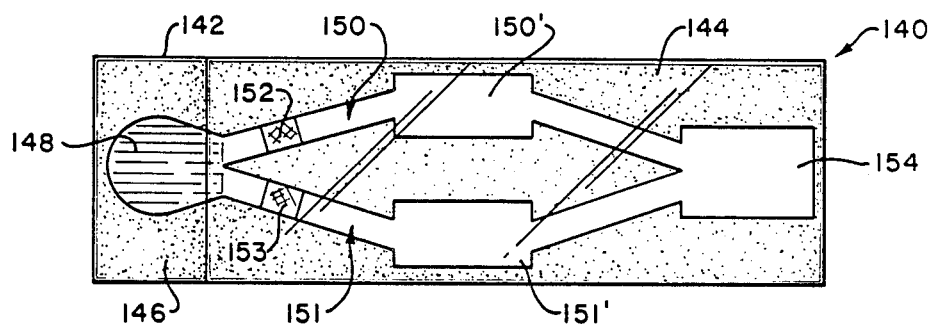
FIG. 8 is a top plan view illustrating a further embodiment of the laboratory slide including a pair of specimen flow channels.
Figure 9:
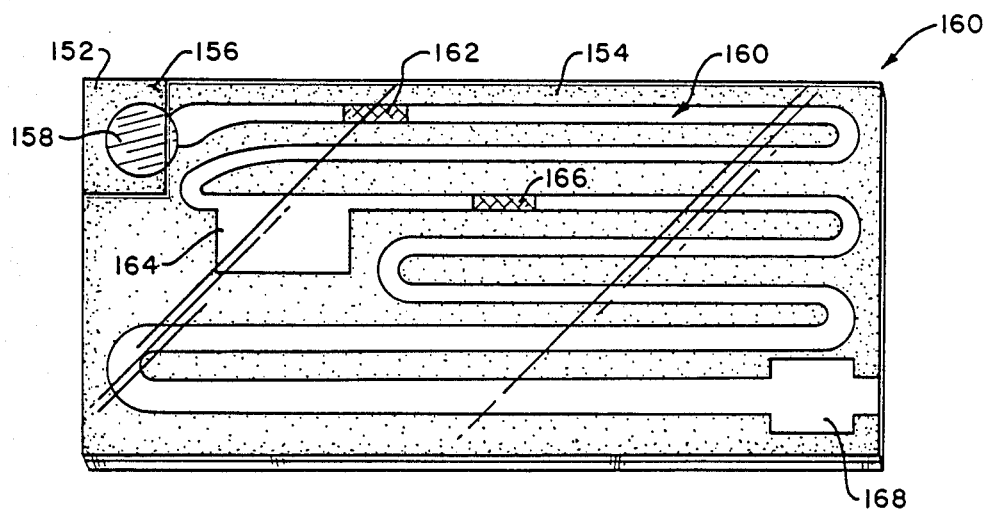
FIG. 9 is a top plan view illustrating another alternative form of the laboratory slide.

In accordance with further forms of the invention, as viewed in FIGS. 7-9 laboratory slides can be prepared to include one or more elongated flow channels which can be associated with one or more selected reagents, thereby providing a convenient kit for use in performing a wide range of clinical tests.

As viewed in one form in FIG. 7, a laboratory slide 120 is formed from a transparent lower slide plate 122 with an overlying transparent coverslip 124 affixed thereto by means of a thin bonding agent 126, all in generally the same manner as described previously herein with respect to FIGS. 1-4. The slide plate and coverslip have generally the same widths and the coverslip is shorter in length to provide end margins 127 and 128 disposed in spaced relation from the ends of the slide plate. The bonding agent 126 is applied to the slide plate in longitudinally extending, transversely spaced strips, similar to FIGS. 5 and 6, to define an elongated flow channel 129 communicating between an entrance end well 130 and an exit end well 132 at opposite ends of the slide plate.

In the embodiment of FIG. 7, a porous filter element 134 is secured onto the slide plate in any suitable manner at the entrance end well 130. The filter element is conveniently included to filter a liquid specimen applied to the well 130 to remove selected particles or cells therefrom prior to specimen flow along the flow channel 129. For example, the filter element can be used to filter and trap red blood cells from a blood specimen thereby separating the serum for flow through the flow channel.

Within the flow channel 129, the specimen can contact a selected reagent 136 which is preapplied to the slide plate in any suitable manner, such as by printing of the reagent, prior to coverslip mounting. The quantity of the reagent 136 within the flow channel can be accurately preselected to provide the desired chemical reaction with the specimen, since the quantitative amount of the specimen and its flow rate of passage through the channel also can be accurately preselected by appropriate control of flow channel dimensions. Advantageously, the quantitative amounts of specimen and reagent used in this and other embodiments of the invention are limited to the dimensions of the flow channel and are thus relatively small in comparison with the requirements of conventional testing procedures. Since the amounts of specimen and reagent are accurately preselected, their relative proportions are also preselected. Moreover, due to the narrow profile of the flow channel, intimate specimen-reagent contact and intermixing is consistently achieved. The particular reagent selected may provide any of a wide number of reactions, such as, for example, a colormetric change in the specimen or size changes of certain specimen cells which can then be entrapped within a tapering channel geometry of the type shown in FIG. 6. A porous wick or pad 138 can be mounted at the exit end well 132 to enhance the drawing action of the specimen through the flow channel, if desired.

In another form of the invention, as depicted in FIG. 8, a laboratory slide 140 can be constructed with multiple parallel flow channels to increase slide utility in performing analytical tests on specimens. In this form, a lower transparent slide plate 142 is secured by an intermediate thin bonding agent 146 to a transparent coverslip 144. The bonding agent 146 is patterned to define a shallow specimen placement site or well 148 at an exposed end of the slide plate, wherein this well can be recessed further by chemical etching or the like as described previously with respect to FIG. 1. In addition, however the bonding agent 146 further defines a pair of parallel flow channels 150 and 151 of narrow, preferably substantially monocellular dimension between the slide plate and the coverslip. Reagents 152 and 153 can be located respectively along the lengths of these flow channels to provide prescribed chemical reactions with the specimen applied to the well for flow into the flow channels. In use of the slide 140, a specimen applied to the well 148 is drawn into and along both flow channels 150 and 151 for respective blending in preselected proportion and in small quantitative amounts with the reagents 152 and 153. The resultant specimen/regent mixtures continue along the flow channels which optionally may include widened chambers 150' and 151' to control mixture flow rate, thereby providing selected "holding" times in accordance with chamber dimensions. The mixtures may flow further into a final common chamber 154 for intermixing to provide a final test result, for example, a colormetric change indicative of a positive or negative reading for a given test procedure. If desired, the common chamber 154 can be recessed or deepened to provide a thicker liquid layer therein to effectively magnify the results of the test.

In accordance with a further form of the invention, a laboratory slide 160, as depicted in FIG. 9, may include an elongated flow channel traversing back and forth to accommodate time delays and mixing requirements of certain test procedures. More particularly, in this embodiment, a lower slide plate 152 has a thin bonding agent 156 applied thereto prior to mounting of a transparent coverslip 154. The illustrative coverslip has a cutout at one corner thereof to expose one corner of the slide plate. The bonding agent 156 is patterned to define a specimen placement site or well 158, which may be etched or otherwise recessed, at the exposed slide plate corner to permit reception of a specimen. The bonding agent further defines an elongated direction-changing flow channel 160. In the illustrative drawings, the flow channel 160 includes a first reagent 162 for mixture with the specimen in prescribed proportion, as previously described, followed by an enlarged chamber 164 to provide a selected mixture holding time and then a second reagent 166. An elongated stretch of the flow channel follows the second reagent and may be associated with a variety of indicia, such as time markings, color indications, and the like for use in interpreting test results at selected positions along the flow path upstream from a final enlarged chamber 168 within which the final test reading may be taken. Accordingly, with this arrangement, multiple reagents and multiple holding times can be built into a single laboratory slide to enable broad application of the invention.

Figure 10:
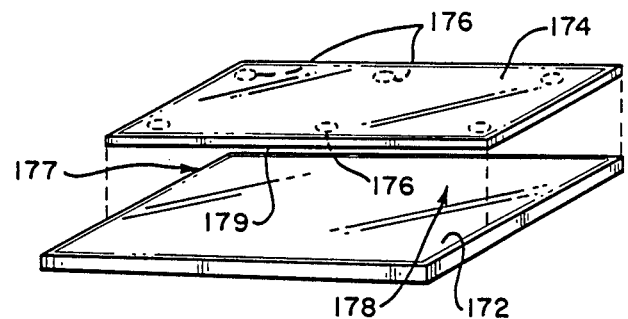
FIG. 10 is an exploded perspective view illustrating chamber alternative embodiment of the invention.

A further, somewhat simplified form of the invention is illustrated in FIG. 10. In this form, a lower slide plate 172 is secured to an overlying coverslip 174 by means of the bonding agent 176 shown as an array of dots preapplied to the underside of the coverslip prior to assembly with the slide plate, although the dots can be applied to the slide plate, if desired. The slide plate and coverslip are again formed from a transparent material, such as glass or plastic, and the bonding agent may comprise an ink, adhesive, or other combination bonding/spacer substance desirably capable of application in a precision controlled, substantially monocellular dimension. The array of bonding agent dots generally defines one or more examination chambers or channels, with two chambers 177 and 178 being shown. Specimen application sites for delivery of specimens to these chambers are defined by one side portion of the slide plate which protrudes laterally beyond one side margin 179 of the coverslip, in generally the same manner as described in FIGS. 1–4.

Figure 11:
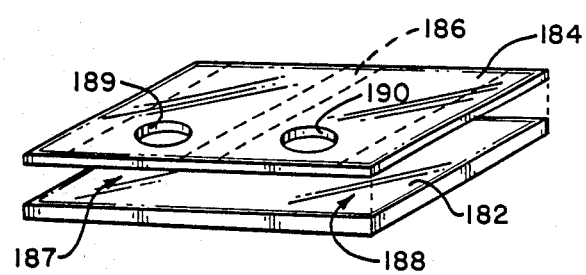
FIG. 11 is an exploded perspective view depicting a further alternative form of the invention.

In another form, as shown in FIG. 11, a slide plate 182 has a transparent coverslip 184 mounted thereon by means of the bonding agent 186 preapplied in strips to the underside of the coverslip, although as noted with respect to FIG. 10, the bonding agent can be preapplied to the slide plate. In this embodiment, the length and width of the slide plate and coverslip are generally the same, with the bonding agent strips defining a pair of low profile examination chambers 187 and 188. Specimens may be applied to these examination chambers via a respective pair of openings 189 and 190 formed in the coverslip 184 near one side margin to define a recessed pair of specimen application sites or wells. These openings 189 and 190 confine specimens placed therein for communication with and capillary drawing into the examination chambers.

Figure 12:
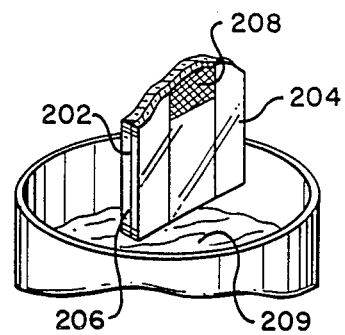
FIG. 12 is another exploded perspective view showing use of a laboratory slide in performing a dip test.

As shown in FIG. 12, the laboratory slide of the invention is useful in performing a wide variety of clinical tests and the like, including, for example, a dip test. More particularly, a slide plate 202 and a coverslip 204 are bonded together by laterally spaced bonding agent strips 206 to define an open-ended, elongated flow channel 207, as described generally herein with respect to the embodiments of FIGS. 5-9. A reagent 208 is preprinted in a preselected amount along the length of the flow channel 207. The thus-constructed slide is useful, for example, as a dipstick by dipping the open end of the flow channel into a liquid specimen 209, such as a urine specimen, resulting in drawing of the specimen into the flow channel in a selected quantity. The drawn specimen quickly flows into contact with the reagent 208 to cause a specimen-reagent reaction which can be read immediately. Various handling, mixing, etc., steps required in prior art test procedures are thus avoided.

Figure 13:
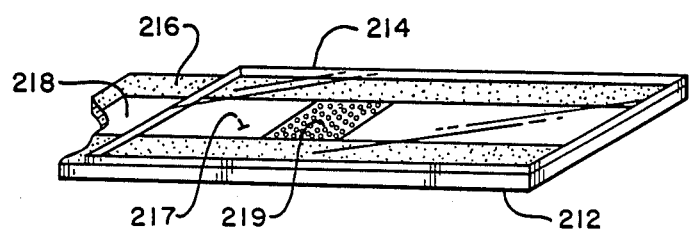
FIG. 13 is a partially fragmented perspective view depicting another form of the laboratory slide including reagent-coated substrate beads disposed along the length of a flow channel.

In still another form, as viewed in FIG. 13, a laboratory slide can be prepared generally in accordance with FIGS. 7-9 to have an elongated flow channel for specimen flow into contact with a reagent, but wherein the reagent is prepositioned along the flow channel in the form of a plurality of reagent coated beads or other suitable particles. More specifically, a lower slide plate 212 and an upper coverslip 214 are secured together by the bonding agent 216 defining the elongated flow channel 217. A specimen application site or well 218 at one exposed end of the slide plate receives a specimen thereon which is drawn by capillary action along the flow channel into contact with the reagent-coated beads 219.

The slide of FIG. 13 is particularly useful in performing certain types of tests wherein it is desirable to attach organisms onto the substrate provided by the beads 219. For example, the reagent coating on the beads might comprise a selected antibody having an affinity for a targeted antigen in the specimen. The specimen, when introduced onto the slide, flows through the flow channel to contact the reagent thereby depositing the antigen on the beads. Subsequent washing of the flow channel with water or a selected buffer solution, followed by an appropriate developer such as a fluorescent tag, and final washing to yield a test result visible through the coverslip. Other test procedures which may be desirable on this type of slide are latex agglutination tests, DNA probe tests, and the like.

Figure 14:
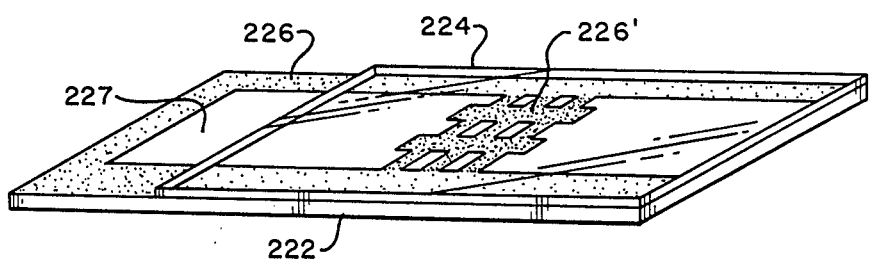
FIG. 14 is a perspective view illustrating a further form of the invention utilizing a dissolving bonding agent impregnated with a selected reagent.

FIG. 14 illustrates a further embodiment of the invention utilizing a reagent mixed directly with a bonding agent 226 disposed between a lower slide plate 222 and an upper coverslip 224. In this embodiment, as shown, the bonding agent 226 defines an elongated flow channel 217 for passage of a liquid-based specimen, as described previously herein with respect to other embodiments. The bonding agent, however, comprises a material which is soluble upon contact with the specimen and further includes a proportion of one or more selected reagents mixed therein. When a specimen flows through the flow channel, the specimen contacts a bonding agent matrix 226' consisting of small lined regions of the reagent/bonding agent material to dissolve the matrix thereby mixing fully with the reagent therein and providing the desired test results.

The improved laboratory slide thus provides, by means of the various disclosed embodiments, a relatively simple and easily manufactured slide having a narrow profile examination chamber or flow channel having a height which can be as small as a substantially monocellular dimension. The slide can be constructed as a multiple chamber device or to include an elongated flow channel for use in a broad range of analytical tests.

A variety of further modifications and improvements to and specific adaptations of the invention will be apparent to those skilled in the art. Accordingly, no limitation on the invention is intended by way of the description herein, except as recited in the appended claims.

What is claimed is:

1. A laboratory slide, comprising:
a lower slide plate;
a transparent coverslip; and
an adhesive bonding agent for securing said coverslip in overlying relation upon said slide plate, said bonding agent being interposed directly between said slide plate and coverslip, said bonding agent being patterned to define at least one chamber with a precision controlled and predetermined spacing dimension between said slide plate and coverslip on the order of about 0.003 inch or less;
said bonding agent being patterned to define an elongated and open-ended flow channel, said bonding agent cooperating with said slide plate and coverslip to close the top, bottom, and sides of said flow channel, having a precision controlled and predetermined cross sectional size and shape, and further including at least one reagent within said flow channel.

2. The laboratory slide of claim 1 wherein said bonding agent secures said slide plate and said coverslip with a spacing therebetween on the order of 0.001 inch or less.

3. The laboratory slide of claim 1 wherein said bonding agent comprises a layer of an adhesive material.

4. The laboratory slide of claim 3 wherein said layer has a thickness of about 0.001 inch or less.

5. The laboratory slide of claim 1 wherein said bonding agent comprises an ink layer.

6. The laboratory slide of claim 5 wherein said layer has a thickness of about 0.001 inch or less.

7. The laboratory slide of claim 1 wherein said bonding agent is patterned to define said at least one chamber with a precision controlled and predetermined varying spacing dimension between said slide plate and coverslip.

8. The laboratory slide of claim 1 wherein said at least one reagent is carried by a substrate within said flow channel.

9. The laboratory slide of claim 1 wherein said flow channel has varying spacing between said slide plate and coverslip along the length of said flow channel.

10. The laboratory side of claim 1 wherein said slide plate and said coverslip are formed from the group of transparent glass and transparent plastic.

11. The laboratory slide of claim 1 wherein said coverslip has at least one opening therein exposing an underlying portion of said slide plate and cooperating therewith to define a specimen application site in flow communication with said chamber.

12. The laboratory slide of claim 1 wherein said slide plate is formed from a relatively rigid transparent material, said coverlip is formed from a comparatively thin and transparent plastic material, and said bonding agent removably securing said coverslip upon said slide plate.

13. A laboratory slide; comprising:
a lower slide plate;

a transparent coverslip; and an adhesive bonding agent for securing said coverslip in overlying relation upon said slide plate, said bonding agent being interposed directly between said slide plate and coverslip, said bonding agent being patterned to define at least one chamber with a precision controlled and predetermined spacing dimension between said slide plate and coverslip on the order of about 0.003 inch or less;

said slide plate being sized to protrude beyond one margin of said coverslip, said bonding agent being patterned to define and to surround at least one upwardly open specimen application site upon the portion of said slide plate protruding beyond said coverslip margin, said application site communicating with said at least one chamber.

14. The laboratory slide of claim 13 wherein said specimen application site is recessed relative to said chamber and bridges a short distance beyond said one margin of said coverslip.

15. The laboratory slide of claim 14 wherein said specimen application site comprises an etched region of said slide plate.

16. The laboratory slide of claim 13 wherein said chamber is vented at a position generally opposite said one side margin.

17. The laboratory slide of claim 13 including filter means disposed at said specimen application site.

18. The laboratory slide of claim 13 wherein said slide plate is further sized to protrude beyond a second end of said coverslip, said flow channel extending between said one end and said second end of said coverslip, and further including wick means on said slide plate generally adjacent said coverslip second end.

19. The laboratory slide of claim 13 wherein said coverslip is formed from transparent plastic and includes a surface discontinuity along said one side margin at a position aligned with said specimen application site.

20. A laboratory slide; comrising:
a lower slide plate;
a transparent coverslip; and
an adhesive bonding agent for securing said coverslip in overlying relation upon said slide plate, said bonding agent being interposed directly between said slide plate and coverslip, said bonding agent being patterned to define at least one chamber with a precision controlled and predetermined spacing dimension between said slide plate and coverslip on the order of about 0.003 inch or less;
said bonding agent being soluble upon contact with a specimen, said bonding agent having at least one reagent carried therein.

21. The laboratory slide of claim 20 wherein said bonding agent is patterned to include a first portion defining the sides of a flow channel between said slide plate and coverslip, and a second portion disposed along said flow channel and having a reduced density per unit of slide plate surface area relative to said first bonding agent portion.

22. A laboratory slide, comprising:
a lower slide plate;
a transparent coverslip; and
bonding means comprising a bonding agent of an adhesive material directly interposed between said slide plate and coverslip and directly securing said slide plate and coverslip generally in overlying relation with respect to each other, said bonding means being patterned to define at least one elongated flow channel between said slide plate and coverslip, said bonding means defining said flow channel with a precision controlled and predetermined spacing dimension between said slide plate and coverslip;
said bonding agent having a thickness on the order of 0.001 inch or less.

23. A laboratory slide, comprising:
a lower slide plate;
a transparent coverslip; and
bonding means comprising a bonding agent of an adhesive material directly interposed between said slide plate and coverslip and directly securing said slide plate and coverslip generally in overlying relation with respect to each other, said bonding means being patterned to define at least one elongated flow channel between said slide plate and coverslip, said bonding means defining said flow channel with a precision controlled and predetermined spacing dimension between said slide plate and coverslip;
said bonding means comprises an ink layer.

24. The laboratory slide of claim 23 wherein said ink layer has a thickness on the order of 0.001 inch or less.

25. A laboratory slide, comprising:
a transparent lower slide plate;
a bonding agent of precision controlled predetermined thickness disposed directly on said slide plate; and
a transparent coverslip secured by direct contact with said bonding agent in overlying relation to and spaced from said slide plate by said bonding agent;
said bonding agent being patterned to define an elongated and open-ended flow channel of varying width between said slide plate and coverslip with the flow channel having closed top, bottom and sides;
the spacing between said slide plate and coverslip being sufficiently small to a draw a liquid specimen along the flow channel.

26. The laboratory slide of claim 25 wherein the spacing between said slide plate and coverslip is on the order of 0.003 inch or less.

27. The laboratory slide of claim 25 wherein the spacing between said coverslip and slide plate varies over at least a portion of said flow channel.

28. A laboratory slide, comprising:
a transparent lower slide plate;
bonding means on said slide plate;
a transparent coverslip secured in overlying relation to and spaced from said slide plate by said bonding means;
said bonding means being patterned to define an elongated and open-ended flow channel between said slide plate and coverslip with the flow channel having closed top, bottom and sides;
the spacing between said slide plate and coverslip beng sufficiently small to draw a liquid specimen along the flow channel; and
further including at least one reagent along said flow channel.

29. The laboratory slide of claim 28 wherein said flow channel comprises at least two flow channel sections, at least one of said flow channel sections having said at least one reagent along the length thereof.

30. The laboratory slide of claim 28 further including wick means at one end of said flow channel.

31. A method of making a laboratory slide, comprising the steps of:
  providing a lower slide plate;
  providing a transparent coverslip;
  applying a thin adhesive bonding agent to one of the slide plate and coverslip with a thickness on the order of 0.003 inch or less and a pattern to define at least one chamber; and
  securing the slide plate and coverslip together by means of the bonding agent.

32. The method of claim 31 wherein the bonding agent has a thickness of 0.001 inch or less.

33. The method of claim 32 wherein said step of applying the bonding agent comprises applying an adhesive.

34. The method of claim 31 wherein said step of applying the bonding agent comprises applying an ink layer and said securing step comprises curing the ink layer into intimate contact with the slide plate and coverslip.

35. The method of claim 31 further including the step of applying at least one reagent within the chamber prior to said securing step.

36. A laboratory slide, comprising:
  a lower slide plate;
  a transparent coverslip; and
  an adhesive bonding agent for securing said coverslip in overlying relation upon said slide plate, said bonding agent being interposed directly between said slide plate and coverslip and directly interconnecting said slide plate and coverslip, said bonding agent being patterned to define an elongated and open-ended flow channel, said bonding agent cooperating with said slide plate and coverslip to close the top, bottom and sides of said flow channel, said flow channel having a precision controlled cross sectional size and shape and predetermined spacing dimension between said slide plate and coverslip on the order of about 0.003 inch or less;
  said bonding agent being patterned to define said flow channel of varying width.

37. A laboratory slide, comprising:
  a lower slide plate;
  a transparent coverslip;
  an adhesive bonding agent for securing said coverslip in overlying relation upon said slide plate, said bonding agent being interposed directly between said slide plate and coverslip and directly interconnecting said slide plate and coverslip, said bonding agent being patterned to define an elongated and open-ended flow channel, said bonding agent cooperating with said slide plate and coverslip to close the top, bottom and sides of said flow channel, said flow channel having a precision controlled cross sectional size and shape and predetermined spacing dimension between said slide plate and coverslip on the order of about 0.003 inch or less; and
  filter means at one end of said flow channel.

* * * * *